US007816622B2

(12) United States Patent
Deaton, Jr. et al.

(10) Patent No.: US 7,816,622 B2
(45) Date of Patent: Oct. 19, 2010

(54) SYSTEM AND METHOD FOR CONTROLLING LASER SHOCK PEENING

(75) Inventors: John Broddus Deaton, Jr., Niskayuna, NY (US); Magdi Naim Azer, Niskayuna, NY (US); Donald Eugene Williams, Jr., Loveland, OH (US); Mark Samuel Bailey, Fairfield, OH (US); Matthew Alan Foister, Cincinnati, OH (US); Michael Paul Hausfeld, Sharonville, OH (US); John Jefferson West, Maineville, OH (US)

(73) Assignee: General Electric Company, Niskayuna, NY (US)

( * ) Notice: Subject to any disclaimer, the term of this patent is extended or adjusted under 35 U.S.C. 154(b) by 294 days.

(21) Appl. No.: 11/863,805

(22) Filed: Sep. 28, 2007

(65) Prior Publication Data

US 2009/0084767 A1    Apr. 2, 2009

(51) Int. Cl.
*B23K 26/00* (2006.01)
(52) U.S. Cl. .............................. 219/121.6; 219/121.83; 219/121.85
(58) Field of Classification Search .............. 219/121.6, 219/121.83, 121.85; 148/565
See application file for complete search history.

(56) References Cited

U.S. PATENT DOCUMENTS

| 4,507,536 A * | 3/1985 | Inoue ..................... 219/121.62 |
| 4,543,486 A * | 9/1985 | Rose ...................... 219/121.85 |
| 4,818,841 A * | 4/1989 | Sliva et al. ............. 219/121.83 |
| 6,333,488 B1 * | 12/2001 | Lawrence et al. ...... 219/121.85 |
| 6,373,876 B1 * | 4/2002 | Dulaney et al. ............... 372/98 |
| 6,512,584 B1 * | 1/2003 | O'Loughlin et al. ......... 427/554 |
| 6,629,464 B2 | 10/2003 | Suh et al. |
| 2001/0045416 A1 * | 11/2001 | Sokol et al. ............. 219/121.62 |
| 2003/0062349 A1 * | 4/2003 | Suh et al. ............... 219/121.83 |
| 2007/0090098 A1 * | 4/2007 | Murao et al. ........... 219/121.83 |
| 2007/0119824 A1 | 5/2007 | Deaton, Jr. et al. |

FOREIGN PATENT DOCUMENTS

| DE | 3935528 A | * | 5/1991 |
| JP | 60-250892 A | * | 12/1985 |
| JP | 01-210185 A | * | 8/1989 |
| JP | 3-47687 A | * | 2/1991 |
| JP | 2005-300182 A | * | 10/2005 |

OTHER PUBLICATIONS machine translation of Japan Patent No. 2005-300,182, published Oct. 2005.*

* cited by examiner

*Primary Examiner*—Geoffrey S Evans
(74) *Attorney, Agent, or Firm*—Richard A. DeCristofaro

(57) ABSTRACT

A laser shock peening system including a workpiece is provided. The laser shock peening system includes a workholding fixture configured to hold the workpiece. The laser shock peening system also includes a laser source configured to emit multiple laser beam pulses on the workpiece. The laser shock peening system further includes an absorptive layer disposed on the workpiece, the absorptive layer configured to absorb the laser beam pulses from the laser source into the workpiece. The laser shock peening system also includes a transparent constraining layer disposed between the laser source and the absorptive layer. The transparent constraining layer is also configured to provide a pressure medium configured to direct multiple reflected laser generated shock waves from the workpiece back into the workpiece. The laser shock peening system also includes a transducer disposed on the workholding fixture and configured to detect multiple acoustic signals emitted from the workpiece.

17 Claims, 3 Drawing Sheets

SYSTEM AND METHOD FOR CONTROLLING LASER SHOCK PEENING

BACKGROUND

The invention relates generally to laser shock peening processes and systems and, more particularly, to a system and method for process monitoring and quality assurance for laser shock peening.

Laser shock peening or laser shock processing, as it is also referred to, is a process for producing a region of deep compressive residual stresses imparted by directing a laser beam on a surface area of a workpiece. Laser shock peening typically uses multiple radiation pulses from high power pulsed lasers to produce shock waves in a workpiece similar to methods disclosed in U.S. Pat. No. 3,850,698, entitled "Altering Material Properties"; U.S. Pat. No. 4,401,477, entitled "Laser Shock Processing"; and U.S. Pat. No. 5,131,957, entitled "Material Properties". Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". The methods typically employ a curtain of water flowing over the workpiece or some other method to provide a confining medium to confine and redirect the process generated shock waves into the bulk of the material of a component being laser shock peened to create the beneficial compressive residual stresses. Other techniques to confine and redirect the shock waves that do not use water have also been developed.

Laser shock peening is being developed for many applications in the gas turbine engine field, some of which are disclosed in the following U.S. Pat. No. 5,756,965 entitled "ON THE FLY LASER SHOCK PEENING"; U.S. Pat. No. 5,591,009, entitled "Laser shock peened gas turbine engine fan blade edges"; U.S. Pat. No. 5,569,018, entitled "Technique to prevent or divert cracks"; U.S. Pat. No. 5,531,570, entitled "Distortion control for laser shock peened gas turbine engine compressor blade edges"; U.S. Pat. No. 5,492,447, entitled "Laser shock peened rotor components for turbomachinery"; U.S. Pat. No. 5,674,329, entitled "Adhesive tape covered laser shock peening"; and U.S. Pat. No. 5,674,328, entitled "Dry tape covered laser shock peening". Successful laser shock peening requires efficient coupling of the laser generated shock wave into the workpiece. If the shock wave is not well coupled into the part being peened, then a level of compressive residual stress is reduced and the desired effect of the laser shock processing is detrimentally affected. Accordingly, any laser shock processing technique would benefit from efficient quality assurance testing during production runs using laser shock peening.

One laser shock peening quality assurance technique previously used is to subject a small sample of processed parts to high cycle fatigue (HCF) testing to verify the desired improvement in fatigue life required from the laser shock processing and notched in a laser shock peened area before testing. This method is destructive of the test piece, fairly expensive and time consuming to carry out, and significantly slows production and the process of qualifying laser shock peened components. An improved quality assurance method of measurement and control of laser shock peening that is accurate, non-destructive, robust in a manufacturing environment, and economically practical is highly desirable. It is also desirable to have a real time non-destructive process monitoring method that may be practically implemented on each workpiece instead of a small sampling of workpieces. Laser shock peening is a process that, as any production technique, involves machinery and is time consuming and expensive. The use of a real time non-destructive evaluation method allows process deviations to be discovered during a production run and corrected immediately.

Therefore, it is desirable to employ a real time process monitoring technique during the laser shock peening process that can address one or more of the aforementioned issues.

BRIEF DESCRIPTION

In accordance with an embodiment of the invention, a laser shock peening system is provided. The laser shock peening system includes a workpiece and a workholding fixture configured to hold the workpiece. The laser shock peening system also includes a laser source configured to emit multiple laser beam pulses onto the workpiece. The laser shock peening system further includes an absorptive layer disposed on the workpiece, the absorptive layer configured to absorb the laser beam pulses from the laser into the workpiece. The laser shock peening system also includes a transparent constraining layer disposed between the laser source and the absorptive layer. The transparent constraining layer is configured to provide a pressure medium configured to direct multiple reflected laser generated shock waves from the workpiece back into the workpiece. The laser shock peening system also includes a transducer disposed on the workholding fixture and configured to detect multiple acoustic signals emitted from the workpiece.

In accordance with another embodiment of the invention, a laser shock peening system is provided. The laser shock peening system includes a workholding fixture configured to hold a workpiece for laser shock peening. The laser shock peening system also includes a laser source configured to direct a laser pulse towards the workpiece held by the workholding fixture. The laser shock peening system also includes an absorptive layer disposed on the workpiece, the absorptive layer configured to absorb the laser beam pulses from the laser into the workpiece. The laser shock peening system also includes a transparent constraining layer disposed between the laser source and the absorptive layer. The transparent constraining layer is configured to provide a pressure medium configured to direct multiple reflected laser generated shock waves from the workpiece back into the workpiece. The laser shock peening system further includes an ultrasonic transducer coupled to the workholding fixture, the transducer configured to detect multiple acoustic signals emitted from the workpiece.

In accordance with another embodiment of the invention, a method for controlling a laser shock peening system is provided. The method includes disposing a workpiece on a workholding fixture. The method also includes disposing an absorptive layer on the workpiece. The method further includes disposing a transparent constraining layer between the absorptive layer and a laser source. The method also includes directing multiple laser beam pulses via the laser source on the workpiece. The method further includes detecting acoustic signals transmitted through the workpiece via a transducer coupled to the workholding fixture. The method also includes measuring a total acoustic energy represented in the acoustic signals detected by the transducer. The method further includes determining an efficiency of coupling of energy representing the laser beam pulses with the workpiece based on the acoustic energy.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include a system and method for controlling laser shock peening. As used herein, the term 'laser shock peening' refers to a process utilizing a laser beam from a laser beam source to generate a strong localized compressive force on a portion of a surface by producing an explosive force via instantaneous ablation or vaporization of a painted or coated or uncoated surface. The system and method disclosed herein include using acoustic signals that are one of the naturally occurring artifacts of a laser interaction with a workpiece in a laser shock peening process.

Figure 1:
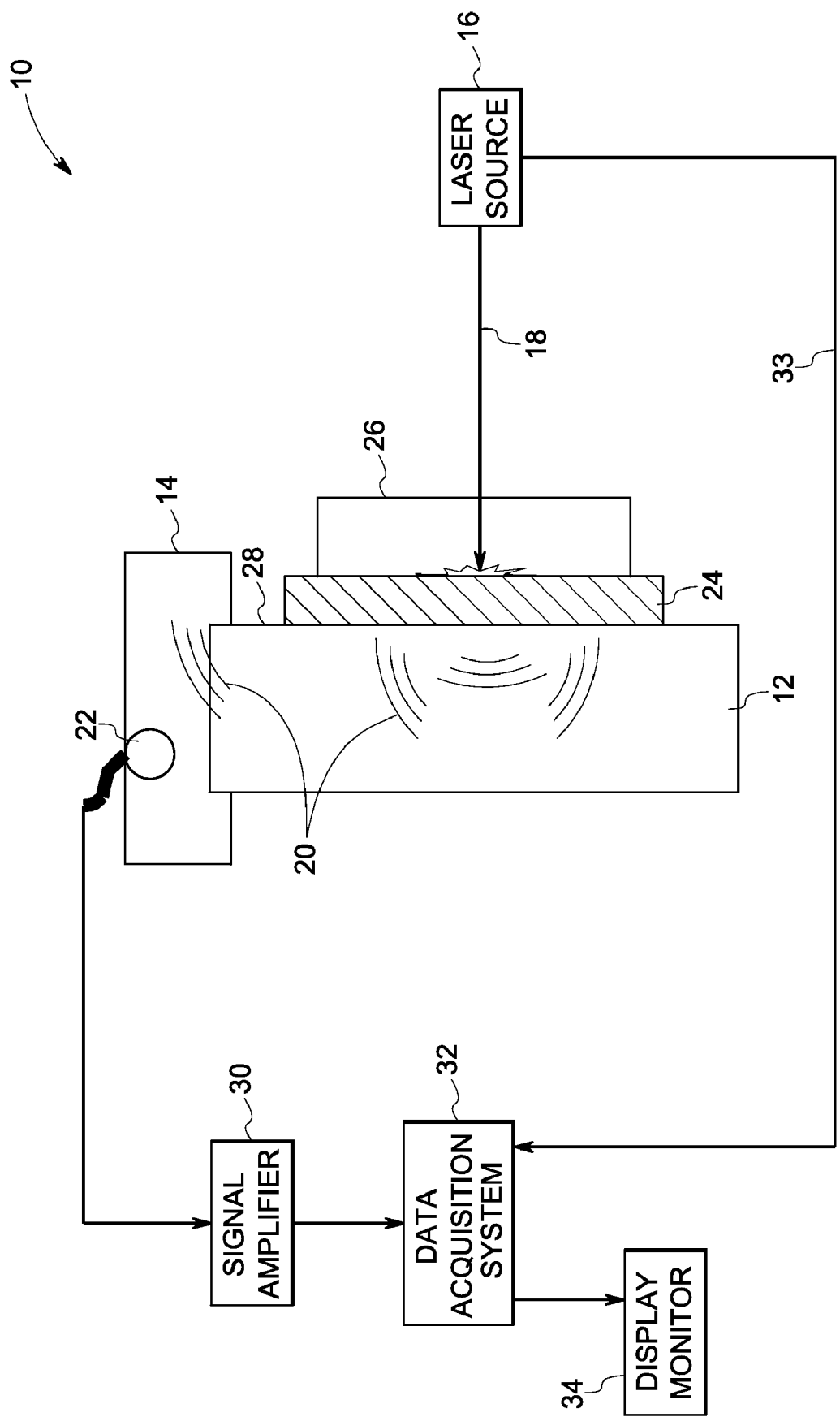
FIG. 1 is a diagrammatic illustration of a laser shock peening system including a transducer.

Turning to the drawings, FIG. 1 is a diagrammatic illustration of a laser shock peening system 10. The laser shock peening system 10 includes a workpiece 12 and a workholding fixture 14 configured to hold the workpiece 12. A laser source 16 emits multiple laser beam pulses 18 onto the workpiece 12, which generates a number of acoustic signals 20 within the workpiece 12. In a particular embodiment, the laser source 16 is a Q-switched laser. A transducer 22 disposed on the workholding fixture 14 detects the acoustic signals 20 emitted from the workpiece 12. In a particular embodiment, the transducer 22 may be disposed on the workholding fixture 14 so as to make a contact with the workpiece 12. The multiple laser beam pulses 18 generate acoustic signals 20 of large amplitudes within the workpiece 12 that propagate significant acoustic signals from the workpiece 12 to the transducer 22. In an example, the acoustic signals 20 include ultrasonic signals. An absorptive layer 24 disposed on the workpiece 12 absorbs the laser beam pulses 18 into the workpiece 12 to improve efficiency. Non-limiting examples of the absorptive layer 24 include a tape or paint. Further, a transparent constraining layer 26 is disposed between the laser source 16 and the absorptive layer 24 that provides a pressure medium to direct multiple reflected laser generated shock waves from the workpiece 12 back into the workpiece 12. In a particular embodiment, the transparent constraining layer includes water. The transparent constraining layer 26 increases the strength of the acoustic signals 20 significantly. In an example, the strength of the acoustic signals 20 is increased by an order of magnitude.

The transducer 22 transmits the acoustic signal 20 detected within the workpiece 12 to a signal amplifier 30 for amplification. A data acquisition system 32 acquires and stores the acoustic signal 20 from the signal amplifier 30. The data acquisition system 32 is triggered by a synchronization signal 33 coincident with emission of the laser pulse 18 such that the timing of the acquisition of the acoustic signal 20 is synchronized to occur after the laser pulse 18 strikes the workpiece 12. Non-limiting examples of sources for the synchronization signal 33 may include an electronic controller of emission of the laser pulse 18, and a photodetector that monitors the actual laser pulse 18 that is emitted. The acoustic signal 20 may also be displayed on a display monitor 34. Several configurations of the data acquisition system 32 are possible.

Some non-limiting examples of the system 32 may include a personal computer (PC) or alternatively be fully contained within the PC. Processing of the acquired acoustic signal 20, calculation of appropriate signal parameter/s, and archiving of measurement results for each of the multiple laser beam pulses 18 are performed by the data acquisition system 32. Results of signal processing may also be displayed on the display monitor 34 to present a real time indication of the performance of the peening process.

Figure 2:
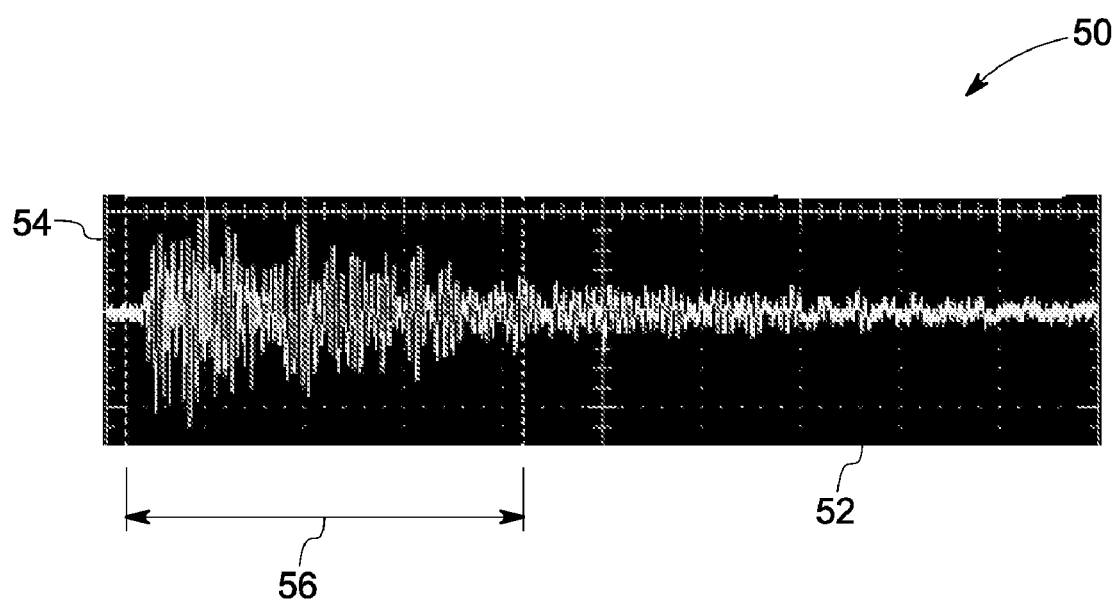
FIG. 2 is a schematic illustration of an exemplary acoustic signal waveform generated from the laser shock peening system in FIG. 1.

There are many process-related factors influencing efficiency of coupling of the laser pulse energy into the shock wave energy in the workpiece 12, and thus extent of desired peening of a surface of the workpiece 12. Some non-limiting examples of these factors include extent of adhesion of the absorptive layer 24 to the workpiece 12, the spatial and temporal profile of the laser beam pulses 18, and the thickness and uniformity of the transparent constraining layer 26. FIG. 2 is a schematic illustration of an exemplary waveform 50 representing the acoustic signals 20 generated by a laser peening process. The X-axis 52 represents time (for example in microseconds (μsec)) and the Y-axis 54 represents amplitude of the acoustic signal 20 recorded by the data acquisition system 32 (for example in volts). Several features related to amplitude and/or frequency (spectral content) of the acoustic signal 20 received by the transducer 22 may be influenced by efficiency of the coupling of the laser beam pulses 18 with the workpiece 12, and thus may be calculated and monitored in real time for purposes of assessing the performance level of the laser shock peening process. An embodiment of this invention uses a 'signal energy' parameter to monitor the efficiency of the laser shock peening process (FIG. 1). In a particular embodiment, the signal energy parameter is represented by the area under the square of the amplitude of the acoustic signal 20 which is calculated and used to represent a measure of the strength of the acoustic signal 20 generated within the workpiece 12 and consequently, a measure of extent of the desired laser peening effect (FIG. 1). In yet another embodiment, a root mean square amplitude of the acoustic signal is calculated to determine the efficiency of coupling. In practice, the calculation of the signal energy parameter is only performed over a gated portion 56 of the entire acoustic record where the length of the signal gate is chosen to encompass the extent of the useful acoustic signal while rejecting the trailing region that largely consists of background noise. Advantageously, employing a signal gate window in such calculation techniques considerably reduces the influence of portions of acoustic record having predominantly background noise.

Figure 3:
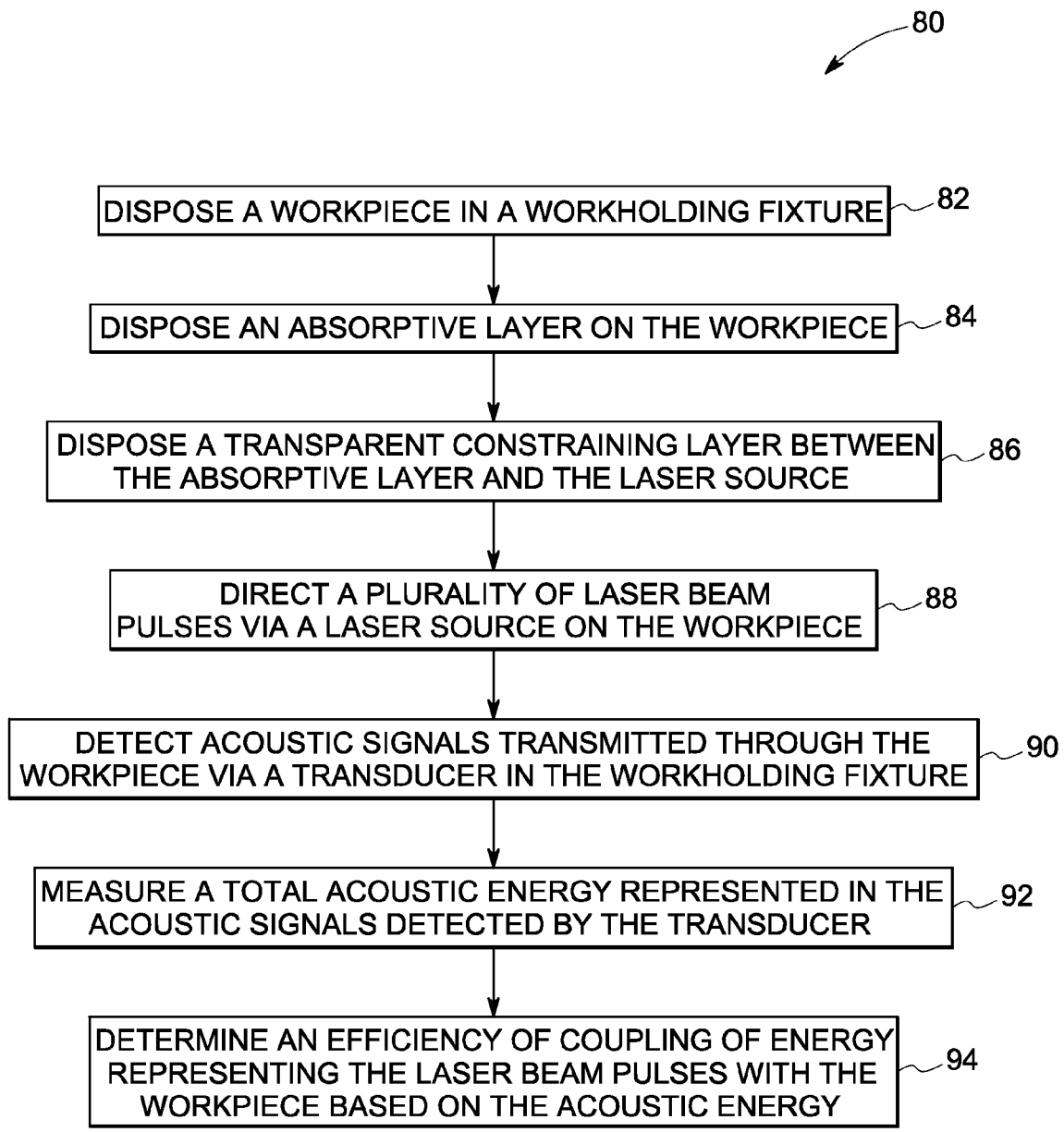
FIG. 3 is a flow chart illustrating steps for an exemplary method for controlling a laser shock peening system.

FIG. 3 is a flow chart representing steps in an exemplary method 80 for monitoring the performance of a laser shock peening system in real time during the processing. The method 80 includes disposing a workpiece in a workholding fixture in step 82. An absorptive layer is disposed on the workpiece in step 84. In a particular embodiment, the adhesive layer is adhesively coupled to the workpiece. Further, a transparent constraining layer is disposed between the absorptive layer and a laser source in step 86. In a non-limiting example, a thin layer of water is disposed between the absorptive layer and a laser source. Multiple laser beam pulses are directed via the laser source onto the workpiece in step 88. Each laser pulse is absorbed at the absorptive layer, producing a shock wave that is further constrained by the transparent constraining layer to propagate into the workpiece to create the desired peening effect in the material of the workpiece. The acoustic waves or signals associated with the shock wave generated by each laser pulse are strong enough to propagate throughout the workpiece and beyond into the workholding fixture. A transducer in the workholding fixture detects the acoustic signals transmitted through the workpiece and into the workholding fixture in step 90. A signal parameter such as the total energy in the acoustic signals is calculated from the raw acoustic signal in step 92. Further, an efficiency of coupling of energy representing the laser beam pulses with the workpiece is determined based on the signal parameter such as the acoustic energy in step 94.

Remote detection of the laser generated acoustic signals with a transducer mounted on the workholding fixture is a key feature of this invention with regards to its suitability for high throughput production applications of this invention. With the transducer permanently mounted on the workholding fixture, it is not necessary to re-affix the transducer each and every time a new part is loaded for laser shock peening. Therefore, parts may be rapidly processed without any time delay encountered from the use of a real-time acoustic monitoring system. While the spirit of the invention would still be retained by an embodiment in which the acoustic signal was detected in the workpiece itself, such a configuration would normally require de-mounting and re-mounting of the transducer for each new part to be peened. Such an operation would be prohibitively time-consuming in a production laser shock peening process where high processing throughput is a requisite for practical and economical utility. Those skilled in the art may also imagine an embodiment of the invention whereby a non-contacting acoustic sensor such as, but not limited to, a laser interferometer, an electro-magnetic acoustic transducer, and a capacitive sensor may be used to detect the acoustic signal within the workpiece itself, thus eliminating the requirement that the acoustic sensor be physically mounted to the workpiece. However, the fixturing to implement these embodiments would add unnecessary complexity and expense and also be difficult if not impossible to implement in a practical and reliable configuration that may be compatible with a high throughput industrial production laser shock peening system.

The various embodiments of a system and method for laser shock peening described above thus provide a convenient and efficient process for real time monitoring. These techniques and systems also allow for remote detection of the acoustic signals generated.

Advantageously, the systems and method may be implemented to provide process performance information in real time to enable immediate response in case of the process running out of control. Furthermore, monitoring of parameters of the acoustic signals generated in the workpiece offers a direct insight into the efficiency of coupling of the laser generated stress waves with the workpiece. In addition, measuring parameters of the acoustic signals is a measurement that is compatible with a typical production laser shock peening plant environment. Performing and recording the measurements of a raw ultrasonic or acoustic signal can be readily adapted to an automated application, allowing for operation at high laser pulse rates that are desirable for high throughput production applications. Furthermore, ultrasonic instrumentation required is quite robust and capable of operating around the clock in an industrial environment that combines flowing and splashing water, high energy pulsed lasers operating at high repetition rates, robotic part handling with high levels of radiated electrical noise produced by the laser and the drive motors of the robots or other machine tools, and cramped spaces crowded with equipment.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of an example of a layer of tape as an absorptive layer described with respect to one embodiment can be adapted for use with a Q-switched laser described with respect to another. Similarly, the various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A laser shock peening system comprising:
a workpiece;
a workholding fixture configured to hold the workpiece;
a laser source configured to emit a plurality of laser beam pulses on the workpiece;
an absorptive layer disposed on the workpiece, the absorptive layer configured to absorb the laser beam pulses from the laser source into the workpiece;
a transparent constraining layer disposed between the laser source and the absorptive layer, the transparent constraining layer configured to:
provide a pressure medium configured to direct a plurality of reflected laser generated shock waves from the workpiece back into the workpiece;
a transducer disposed on the workholding fixture and configured to detect acoustic signals emitted from the workpiece for each laser beam pulse;
a data acquisition system configured to:
measure a total acoustic energy represented in the acoustic signals detected by the transducer for each laser beam pulse; and
determine an efficiency of coupling of energy for each laser beam pulse associated with the workpiece based on the total acoustic energy associated with each laser beam pulse.

2. The system of claim 1, further comprising a signal amplifier configured to amplify the acoustic signals from the transducer.

3. The system of claim 1, wherein the acoustic signals comprise ultrasonic signals.

4. The system of claim 1, further comprising a display monitor configured to display an output of the data acquisition system.

5. The system of claim 1, wherein the transparent constraining layer comprises water.

6. The system of claim 1, wherein the absorptive layer comprises at least one of a tape or a paint.

7. The system of claim 1, wherein the laser source comprises a Q-switched laser.

8. A laser shock peening system comprising:
a workholding fixture configured to hold a workpiece for laser shock peening;
a laser source configured to direct a plurality of laser beam pulses towards the workpiece held by the workholding fixture;

an absorptive layer disposed on the workpiece, the absorptive layer configured to absorb the laser beam pulses from the laser source into the workpiece;

a transparent constraining layer disposed between the laser source and the absorptive layer, the transparent constraining layer configured to:

provide a pressure medium configured to direct a plurality of reflected laser generated shock waves from the workpiece back into the workpiece;

a transducer coupled to the workholding fixture, the transducer configured to detect acoustic signals emitted from the workpiece for each laser beam pulse;

a data acquisition system configured to:

measure a total acoustic energy represented in the acoustic signals detected by the transducer for each laser beam pulse; and determine an efficiency of coupling of energy for each laser beam pulse associated with the workpiece based on the total acoustic energy associated with each laser beam pulse.

9. The system of claim 8, wherein the laser source comprises a Q-switched laser.

10. The system of claim 8, further comprising a signal amplifier configured to amplify the acoustic signals from the transducer.

11. The system of claim 8, wherein the plurality of acoustic signals comprise ultrasonic signals.

12. The system of claim 8, further comprising a display monitor configured to display an output of the data acquisition system.

13. The system of claim 8, wherein the transparent constraining layer comprises water.

14. The system of claim 8, wherein the absorptive layer comprises at least one of a tape or a paint.

15. A method for controlling a laser shock peening system comprising:

disposing a workpiece in a workholding fixture;

disposing an absorptive layer on the workpiece;

disposing a transparent constraining layer between the absorptive layer and a laser source;

directing a plurality of laser beam pulses via the laser source on the workpiece;

detecting acoustic signals transmitted through the workpiece via a transducer coupled to the workholding fixture;

measuring a total acoustic energy represented in the acoustic signals detected by the transducer for each laser beam pulse; and determining an efficiency of coupling of energy for each laser beam pulse associated with the workpiece based on the total acoustic energy associated with each laser beam pulse.

16. The method of claim 15, wherein disposing an absorptive layer comprises adhesively coupling the absorptive layer on the workpiece.

17. The method of claim 15, wherein disposing a transparent constraining layer comprises introducing a thin layer of water.

* * * * *